United States Patent

Muckenhirn et al.

(10) Patent No.: US 10,112,654 B1
(45) Date of Patent: Oct. 30, 2018

(54) C-PILLAR ASSEMBLY FOR VEHICLE BODY

(71) Applicant: Ford Global Technologies, LLC, Dearborn, MI (US)

(72) Inventors: Tyler Muckenhirn, Livonia, MI (US); Steven Frank, Dearborn, MI (US); Chienhom Lee, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/666,826

(22) Filed: Aug. 2, 2017

(51) Int. Cl.
| | |
|---|---|
| *B62D 25/04* | (2006.01) |
| *B62D 29/00* | (2006.01) |
| *B62D 25/20* | (2006.01) |
| *B62D 25/02* | (2006.01) |
| *B62D 27/02* | (2006.01) |
| *B62D 21/15* | (2006.01) |

(52) U.S. Cl.
CPC ........... *B62D 25/04* (2013.01); *B62D 21/157* (2013.01); *B62D 25/025* (2013.01); *B62D 25/2036* (2013.01); *B62D 27/02* (2013.01); *B62D 29/007* (2013.01)

(58) Field of Classification Search
CPC ... B62D 25/04; B62D 21/157; B62D 25/2036
USPC .................................................. 296/193.06
See application file for complete search history.

(56) References Cited

U.S. PATENT DOCUMENTS

| | | | |
|---|---|---|---|
| 6,293,618 B1 | 9/2001 | Sukegawa et al. | |
| 6,824,204 B2* | 11/2004 | Gabbianelli | B62D 21/152 |
| | | | 296/193.06 |
| 7,152,914 B2 | 12/2006 | Dingman et al. | |
| 7,857,377 B2 | 12/2010 | Chen et al. | |
| 9,751,569 B2* | 9/2017 | Ayuzawa | B62D 25/2036 |
| 2010/0123337 A1* | 5/2010 | Tamura | B62D 25/02 |
| | | | 296/203.03 |
| 2012/0299334 A1* | 11/2012 | Takayama | B62D 25/02 |
| | | | 296/193.06 |
| 2015/0258956 A1* | 9/2015 | Sassi | B60R 21/0136 |
| | | | 701/45 |
| 2016/0059897 A1* | 3/2016 | Lang | B62D 29/001 |
| | | | 296/209 |

(Continued)

FOREIGN PATENT DOCUMENTS

| | | |
|---|---|---|
| JP | H04129886 A | 4/1992 |
| JP | 2006341687 A | 12/2006 |

*Primary Examiner* — Pinel E Romain
(74) *Attorney, Agent, or Firm* — Jason Rogers; Brooks Kushman P.C.

(57) ABSTRACT

A vehicle C-pillar assembly including a C-pillar, a rear quarter extension, and a rocker panel is provided. The rear quarter extension mounts to the C-pillar and includes an arc portion. The rocker panel mounts to the rear quarter extension to define a horizontal joint therebetween and includes a notch providing space for the arc portion to extend upward along the C-pillar. The rocker panel may include an end and the rocker panel may be secured to the C-pillar so that the end extends rearward of the C-pillar to contact and reduce rotation of a tire mounted adjacent to the C-pillar when a force directs the tire forward. A profile of the rocker panel may be a C shape. The rocker panel may extend from a vehicle A-pillar rearwardly past the C-pillar. The rocker panel may be roll-formed and of an ultra-high strength steel.

20 Claims, 8 Drawing Sheets

(56) References Cited

U.S. PATENT DOCUMENTS

2017/0203792 A1* 7/2017 Sunohara ............ B62D 25/2036
2018/0186411 A1* 7/2018 Ast ...................... B62D 25/025

* cited by examiner

Prior Art

C-PILLAR ASSEMBLY FOR VEHICLE BODY

TECHNICAL FIELD

This disclosure relates to components for joint assemblies between vehicle pillars and a vehicle rocker panel.

BACKGROUND

Joint assemblies between vehicle pillars and vehicle rocker panels undergo a greater amount of stress for electrified vehicles in comparison to combustion engine vehicles due to an increased weight. The electrified vehicle joint assemblies require different materials and designs to achieve acceptable structural rigidity. Current practices may use reinforcement components to achieve acceptable structural rigidity but add additional weight and cost to manufacturing the components for the joint assemblies.

This disclosure is directed to solving the above problems and other problems as summarized below.

SUMMARY

According to an aspect of the present disclosure, a vehicle C-pillar assembly includes a C-pillar, a rear quarter extension, and a rocker panel. The rear quarter extension mounts to the C-pillar and includes an arc portion. The rocker panel mounts to the rear quarter extension to define a horizontal joint therebetween and includes a notch providing space for the arc portion to extend upward along the C-pillar. The rocker panel may include an end and the rocker panel may be secured to the C-pillar so that the end extends rearward of the C-pillar to contact and reduce rotation of a tire mounted adjacent to the C-pillar when a force directs the tire forward. A profile of the rocker panel may be a C shape. The rocker panel may extend from a vehicle A-pillar rearwardly past the C-pillar. The rocker panel may be roll-formed and of an ultra-high strength steel. The rocker panel may be treated to form a fully martensitic microstructure. The rocker panel may be a rocker outer panel sized for securing to a rocker inner panel to define a tubular component.

According to another aspect of the present disclosure, a rocker panel for a vehicle pillar joint assembly includes a first flange, a second flange, a first horizontal flange extending between the first flange and the second flange, a third flange, and a second horizontal flange extending between the second flange and the third flange. The flanges are arranged with one another to define a C-shape and are sized for mounting to a rear quarter extension to define a horizontal joint therebetween. The first flange, the second flange, and the third flange may each be located on planes oriented parallel with one another. The first flange may be sized for mounting to one of a vehicle A-pillar, a vehicle B-pillar, and a vehicle C-pillar. The second flange and second horizontal flange may define a longitudinal axis along an edge therebetween oriented parallel with an axis defined by the horizontal joint. The first flange and the third flange may be sized for mounting to corresponding flanges of a rocker inner panel to form a hollow tubular component. The rocker panel may be fully martensitic and sized to extend from a vehicle A-pillar rearward of a vehicle C-pillar. The rocker panel may be a rocker outer panel sized for securing to a rocker inner panel to define a tubular component.

According to a further aspect of the present disclosure, a vehicle C-pillar joint assembly includes a vehicle C-pillar, a rear quarter extension, and a rocker panel. The rear quarter extension is mounted to the vehicle C-pillar and includes a base portion. The rocker panel is mounted to the rear quarter extension, covers the base portion, and defines a horizontal joint oriented parallel with an axis defined by the base portion. A length between the horizontal joint and the base portion is variable based on a selected number of weld rows to secure the rear quarter extension and the rocker panel to one another. The rear quarter extension may further include a tab for mounting a flange of the rocker panel thereto to further orient the horizontal joint in parallel with the axis defined by the base portion. The rocker panel may further include an end and the rocker panel may be secured to the vehicle C-pillar so that the end extends rearward of the vehicle C-pillar to contact and reduce rotation of a tire mounted adjacent to the vehicle C-pillar when a force directs the tire forward. The base portion of the rear quarter extension and the horizontal joint may be spaced from one another such that welds securing the rear quarter extension to the rocker panel are on a first plane different than a second plane of a moment of the vehicle C-pillar. The rocker panel may be treated to have a fully martensitic microstructure and anti-corrosion characteristics. The base portion of the rear quarter extension may be spaced from the horizontal joint approximately 17 mm-45 mm.

DETAILED DESCRIPTION

Embodiments of the present disclosure are described herein. It is to be understood, however, that the disclosed embodiments are merely examples and other embodiments can take various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ embodiments of the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
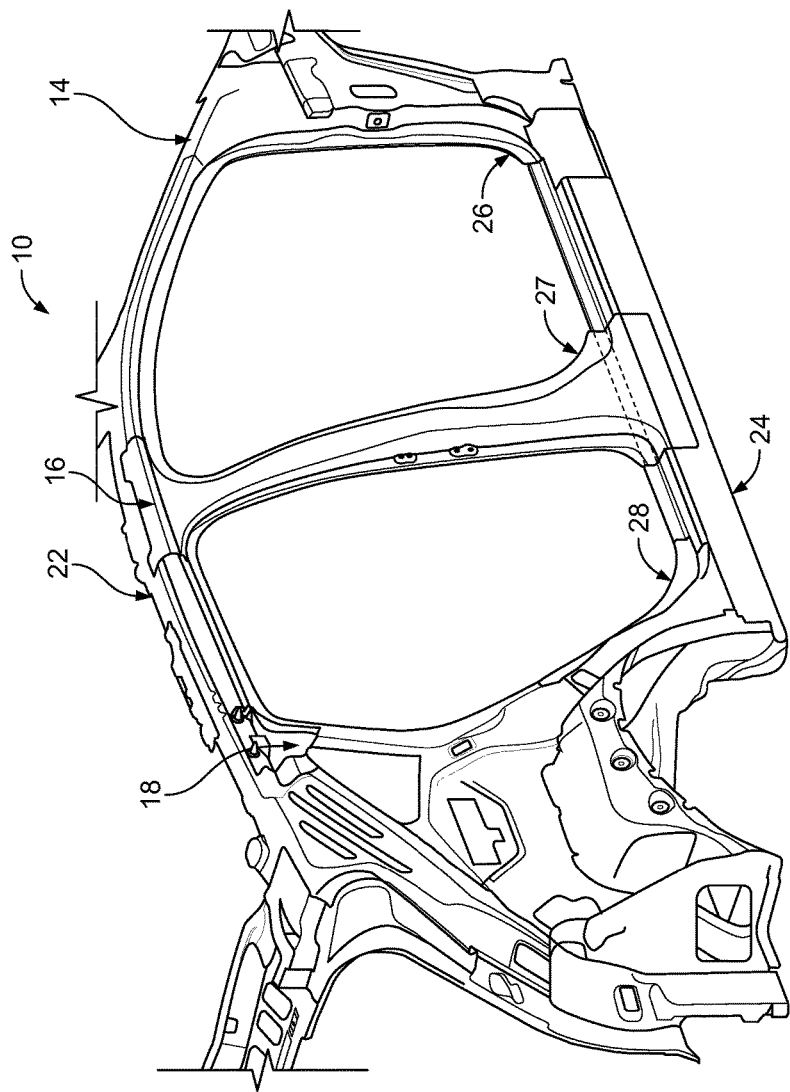
FIG. 1 is a fragmentary perspective view of an example of portion of a vehicle body.

FIG. 1 illustrates an example of a portion of a vehicle body referred to generally as a vehicle body 10. The vehicle body 10 includes an A-pillar assembly 14, a B-pillar assembly 16, and a C-pillar assembly 18. A roof rail 22 is secured to an upper portion of each of the pillars and a rocker panel assembly 24 is secured to a lower portion of each of the pillars. The pillar assemblies, the roof rail 22, and the rocker panel assembly 24 are arranged with one another to define openings for vehicle doors.

The vehicle body includes an A-pillar joint assembly 26, a B-pillar joint assembly 27, and a C-pillar joint assembly 28. Each of the joint assemblies include components from the respective pillar secured to the rocker panel assembly 24. These joint assembly locations receive stress in a form of energy when the vehicle body 10 receives an impact. Preferably, each of the joint assemblies is arranged with a respective pillar such that when a moment is applied to the pillar a load is uniformly distributed across the joint assembly.

Figure 2:
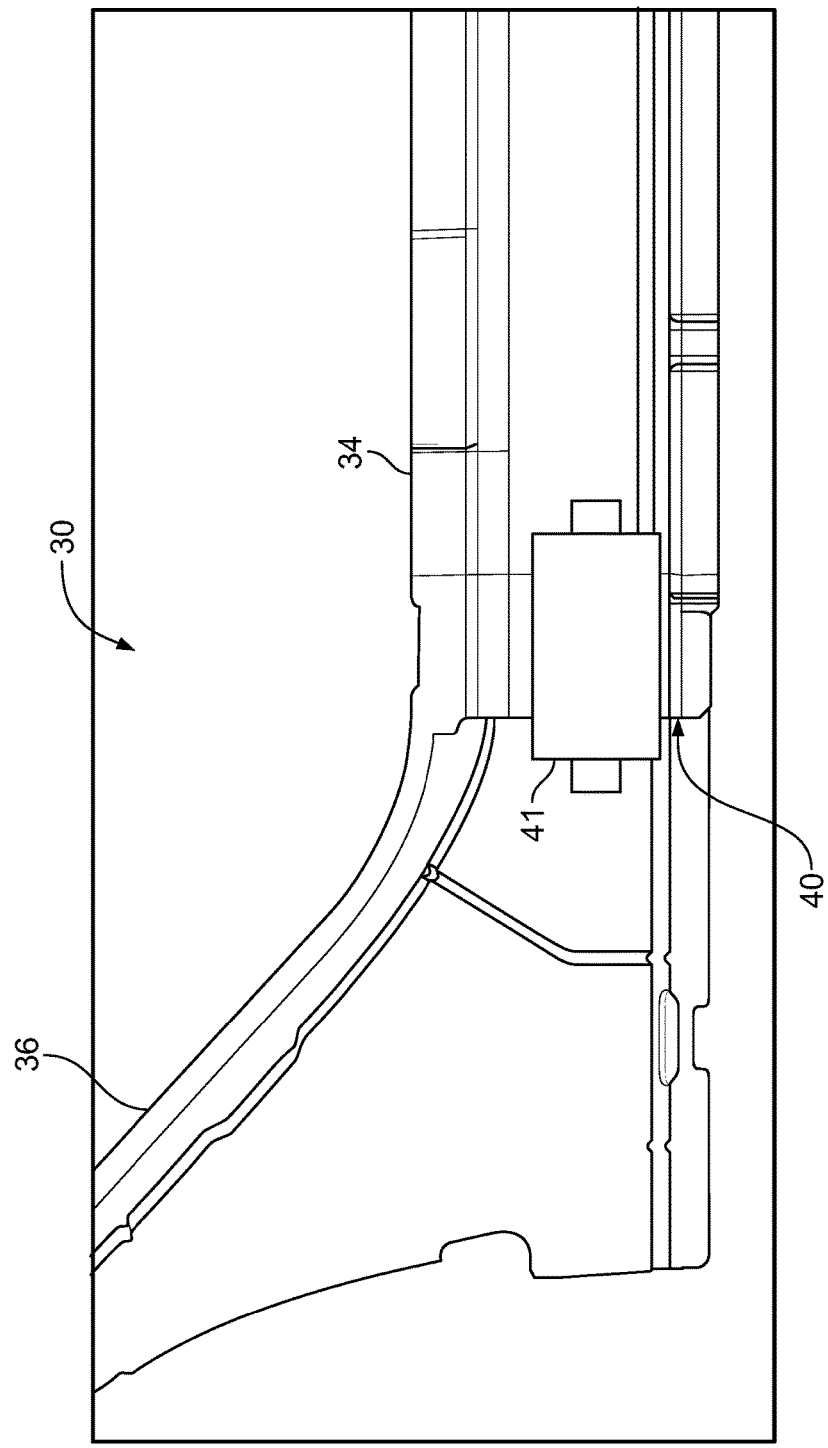
FIG. 2 is a fragmentary inboard side view of an example of a portion of a previously known C-pillar joint assembly for a vehicle body including a reinforcement component.
Figure 3:
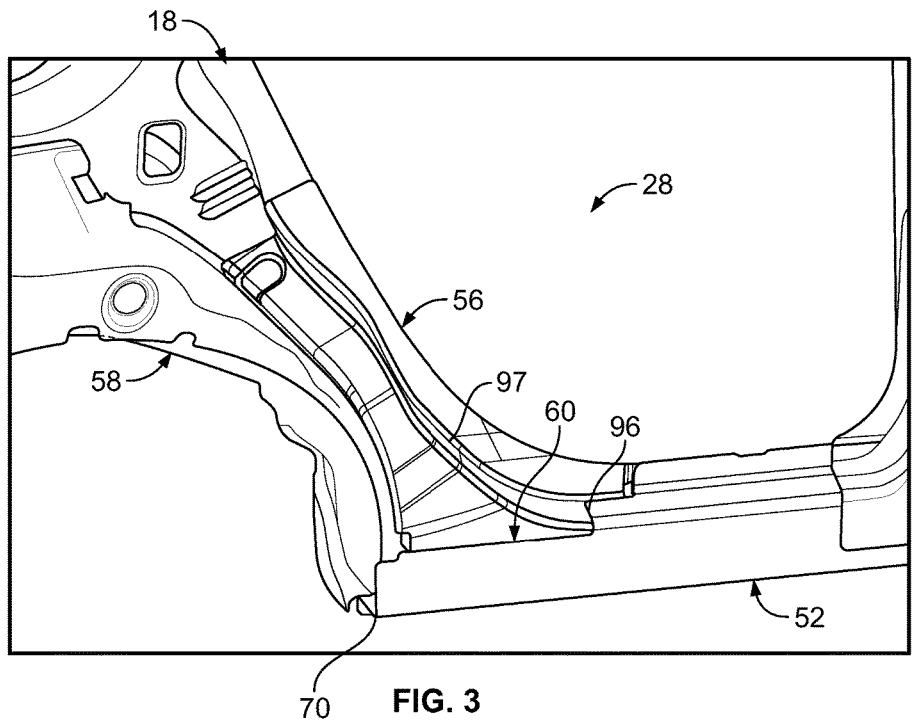
FIG. 3 is a fragmentary outboard perspective view of an example of a C-pillar joint assembly for a vehicle body.

FIG. 2 illustrates an example of a previously known C-pillar joint assembly from an inboard side view referred to as a C-pillar joint assembly 30. The C-pillar joint assembly 30 includes a rocker inner panel 34 mounted to a C-pillar extension panel 36. The mounting of the rocker inner panel 34 to the C-pillar extension panel 36 creates a vertical joint 40. Reinforcement components, such as a rocker reinforcement component 41, are needed at the vertical joint 40 to achieve satisfactory structural rigidity of the C-pillar joint assembly 30. This rocker reinforcement component 41 add cost and weight. The rocker inner panel 34 is a hot stamped boron component without anti-corrosion characteristics. Durability issues arise from water collecting within the C-pillar joint assembly 30 due to a lack of anti-corrosion characteristics of these components.

FIGS. 3 through 6B illustrate further detail of the C-pillar joint assembly 28 shown in FIG. 1. The C-pillar joint assembly 28 includes portions of the rocker panel assembly 24 and the C-pillar assembly 18. For example, the C-pillar joint assembly 28 includes a rocker outer panel 52, a rocker inner panel 54, a wheel house outer 56 (sometimes referred to as a rear quarter extension), and a quarter inner 57 (sometimes referred to as a rear quarter extension). The C-pillar joint assembly 28 is mounted to a wheel house 58 of the C-pillar assembly 18.

Figure 4:
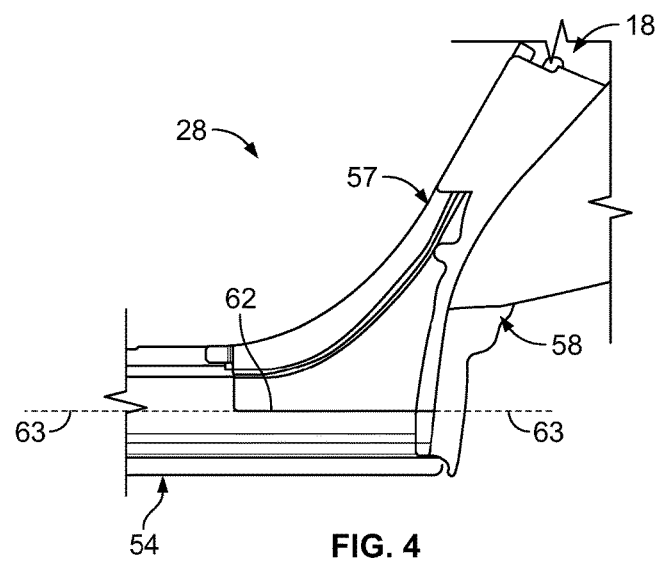
FIG. 4 is a fragmentary inboard side view of the example of the C-pillar joint assembly of FIG. 3.
Figure 5:
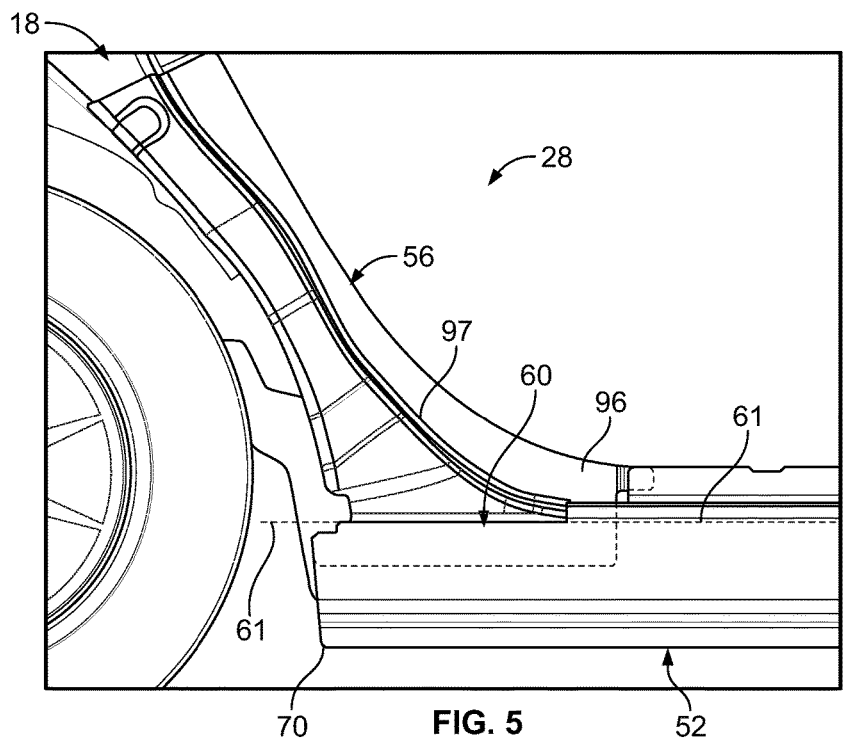
FIG. 5 is a fragmentary outboard side view of the example of the C-pillar joint assembly of FIG. 3.

In this example, the rocker outer panel 52 and the rocker inner panel 54 are mounted to the wheel house outer 56 and the quarter inner 57 creating an outer horizontal joint 60 (FIG. 5) and an inner horizontal joint 62 (FIG. 4). The outer horizontal joint 60 and the inner horizontal joint 62 provide a structural rigidity improvement in comparison to the vertical joint 40. For example, the outer horizontal joint 60 and the inner horizontal joint 62 provide an increase in moment resistance relating to energy from rear impacts in comparison to the vertical joint 40 as further described herein. The outer horizontal joint 60 defines an outer axis 61 and the inner horizontal joint 62 defines an inner axis 63.

The rocker outer panel 52 is oriented with the vehicle body 10 so that an end 70 of the rocker outer panel 52 extends rearward of a lower portion of the C-pillar assembly 18. For example, the end 70 may extend within a wheel house cavity defined by the wheel house 58. The end 70 extends a predetermined length into the wheel house cavity to assist in reducing rotation of a tire 72 (shown in FIG. 5) mounted within the wheel house cavity when a force directs the tire 72 toward the end 70. For example, under a rear impact to the vehicle body 10, the tire 72 may be directed forward and contact the end 70 of the rocker outer panel 52. In this example, the end 70 may reduce a rotation of the tire 72 to assist in reducing forward movement of the vehicle following the rear impact.

Figure 6A:
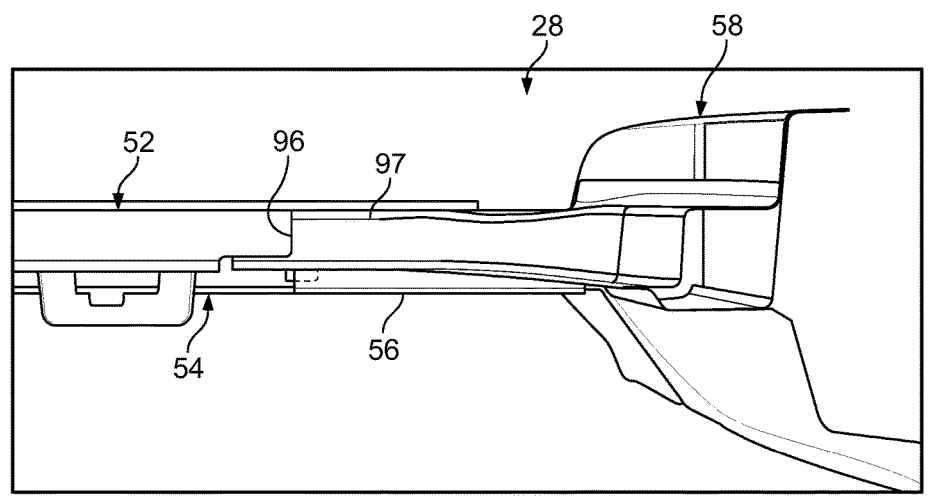
FIG. 6A is a fragmentary top plan view of the example of the C-pillar joint assembly of FIG. 3.
Figure 6B:
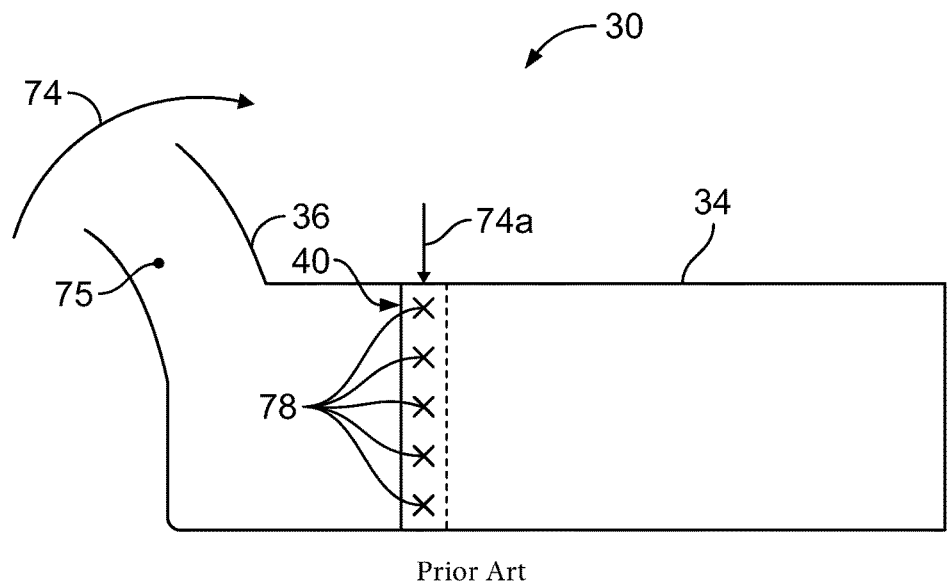
FIG. 6B is a schematic diagram illustrating two examples of force acting upon the C-pillar joint assembly of FIG. 2 and the C-pillar joint assembly of FIG. 3.
Figure 6B:
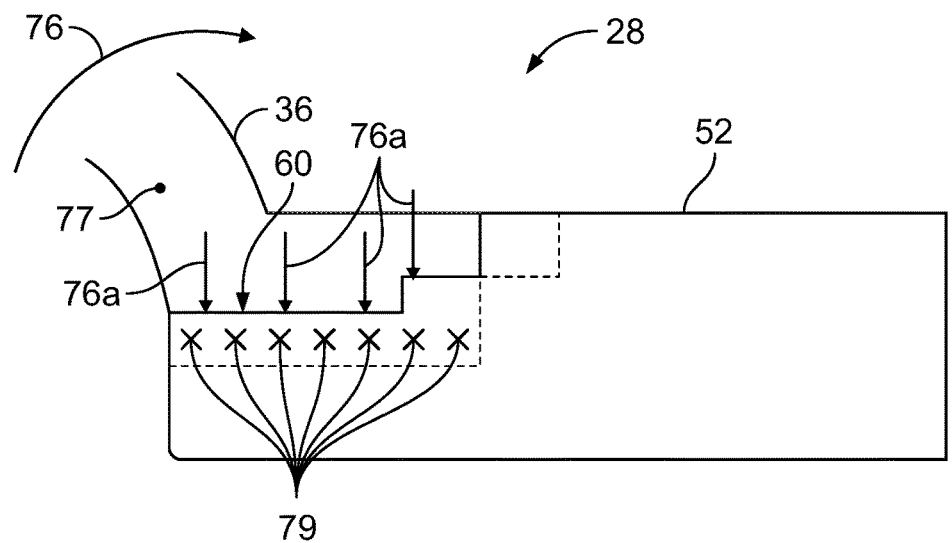

FIG. 6B further illustrates a comparison of the C-pillar joint assembly 30 and the C-pillar joint assembly 28. An example moment 74 is shown about a center point 75 and an example moment 76 is shown about a center point 77. Vertical weld spots 78 are shown oriented vertically along the vertical joint 40 and horizontal weld spots 79 are shown oriented horizontally along the outer horizontal joint 60. A force resulting from the moment 74 is represented with an arrow 74a oriented in line with the vertical weld spots 78. This alignment with the vertical weld spots 78 provides for a likelihood of component failure on either side of the vertical weld spots 78. In contrast, a force resulting from the moment 76 is represented with arrows 76a distributed across the horizontal weld spots 79. This distribution across the horizontal weld spots 79 provides for the C-pillar joint assembly 28 to have a higher structural rigidity than the joint assembly.

Figure 7:
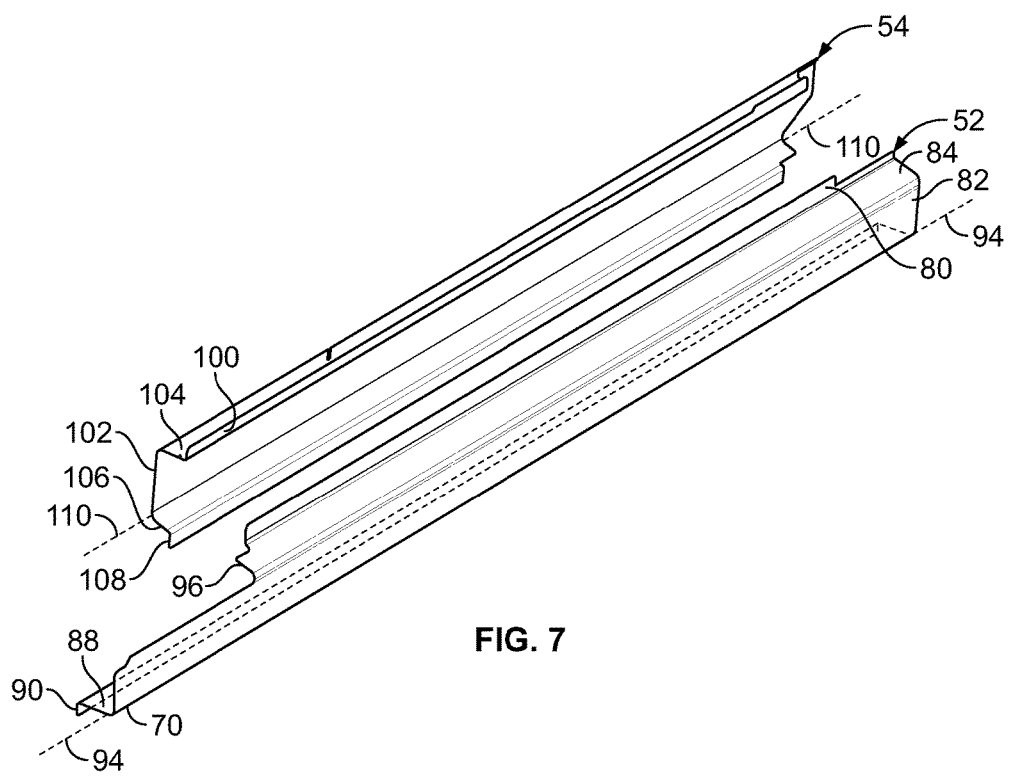
FIG. 7 is a perspective view of an example of a rocker outer panel and an inner rocker panel shown spaced from one another.

FIG. 7 illustrates further detail of the rocker outer panel 52 and the rocker inner panel 54. The rocker outer panel 52 includes a first flange 80, a second flange 82, and a first horizontal flange 84 extending between the first flange 80 and the second flange 82. A second horizontal flange 88 extends from a base portion of the second flange 82 to a third flange 90. The rocker outer panel 52 defines a first longitudinal axis 94 along an edge between the second flange 82 and the second horizontal flange 88. The first longitudinal axis 94 is oriented parallel to the outer axis 61 defined by the outer horizontal joint 60 and the inner axis 63 defined by the inner horizontal joint 62 when the rocker outer panel 52 is secured to the wheel house outer 56. The flanges of the rocker outer panel 52 may be arranged with one another to define a C shape.

The rocker outer panel 52 defines a notch 96 sized to facilitate securement of the rocker outer panel 52 to the wheel house outer 56 and the C-pillar assembly 18. For example and referring again to FIG. 3, the notch 96 provides space for an arc portion 97 of the wheel house outer 56 to extend upward along the C-pillar assembly 18. The arc portion 97 is a component of the C-pillar joint assembly 28. The first horizontal flange 84 of the rocker outer panel 52 is secured to another portion of the wheel house outer 56 adjacent the arc portion.

The rocker inner panel 54 includes a first flange 100, a second flange 102, and a first horizontal flange 104 extending between the first flange 100 and the second flange 102. A second horizontal flange 106 extends from a base portion of the second flange 102 to a third flange 108. The rocker inner panel 54 defines a second longitudinal axis 110 along an edge between the second flange 102 and the second horizontal flange 106. The second longitudinal axis 110 is oriented parallel to the outer axis 61 and the inner axis 63 when the rocker inner panel 54 is secured to the quarter inner 57. The flanges of the rocker inner panel 54 may be arranged with one another to define a C shape.

Figure 8:
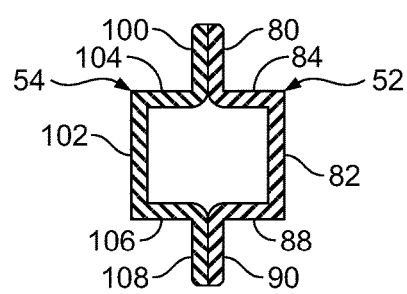
FIG. 8 is a front view, in cross-section, of the rocker outer panel and the inner rocker panel of FIG. 7 shown mounted to one another.

The flanges of the rocker outer panel 52 and the flanges of the rocker inner panel 54 form a hollow tubular component when secured to one another as shown in FIG. 8. The flanges of the rocker outer panel 52 and the flanges of the rocker inner panel 54 are shaped to facilitate securement of the pillars to the rocker panel assembly 24 at respective pillar joint assemblies.

Figure 9:
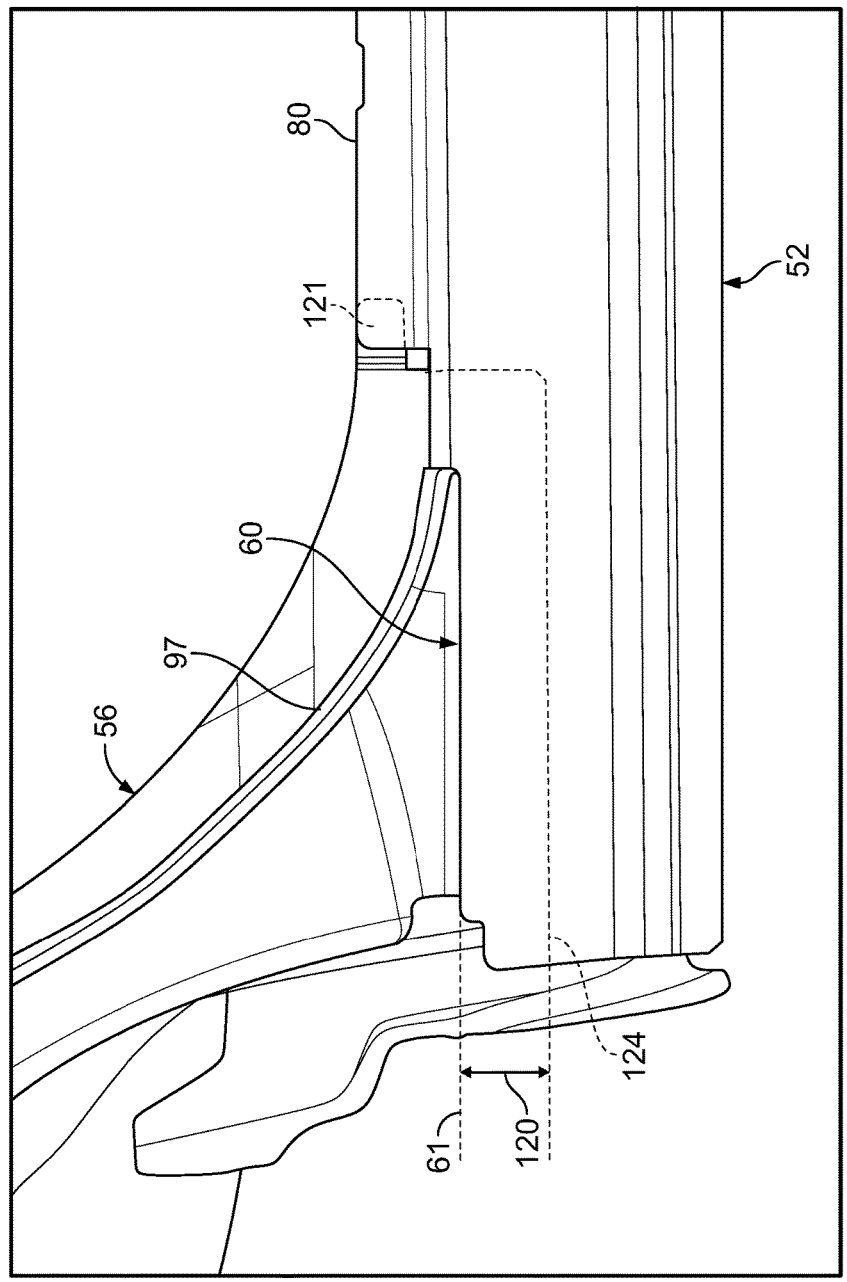
FIG. 9 is another fragmentary outboard side view of the example of the C-pillar joint assembly of FIG. 3.

FIG. 9 illustrates a tunable overlap relationship between the rocker outer panel 52 and the wheel house outer 56. Inclusion of the outer horizontal joint 60 provides for various C-pillar joint assembly 28 embodiments having a tunable length 120 between the outer horizontal joint 60 (outer axis 61) and a base portion 124 of the wheel house outer 56. A length of the length 120 may be based on an amount of space desired to accommodate weld points to secure the rocker outer panel 52 to the wheel house outer 56. The wheel house outer 56 may include a tab 121 to secure the first flange 80 of the rocker outer panel 52 to the wheel house outer 56. A capability to tune the length of the length 120 provides options for different structural rigidity characteristics and weld configurations of the C-pillar joint assembly 28 based on vehicle design requirements.

In one example, the length 120 between the outer horizontal joint 60 and the base portion 124 of the wheel house outer 56 may be between 17 mm and 45 mm. At 17 mm, the wheel house outer 56 and the quarter inner 57 may provide space for one row of welds securing the respective rocker outer panel 52 and the rocker inner panel 54 thereto. At 45 mm, the wheel house outer 56 and the quarter inner 57 may provide space for two rows of welds securing the respective rocker outer panel 52 and the rocker inner panel 54 thereto. It is contemplated that the length 120 may be greater than 45 mm to provide space for one or more additional rows of welds.

Figure 10:
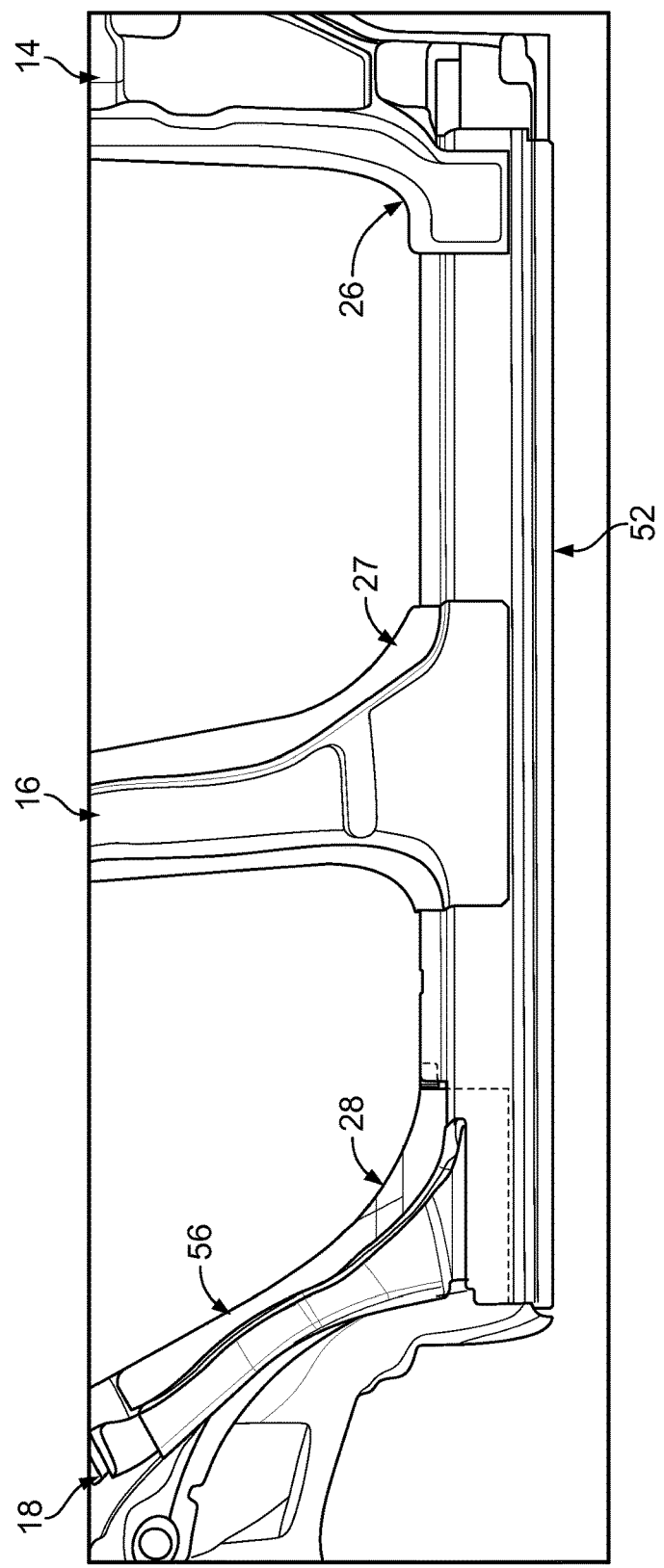
FIG. 10 is a fragmentary outboard side view of an example of a rocker outer panel showing the rocker outer panel extending from an A-pillar rearward of a C-pillar of a vehicle body.

FIG. 10 further illustrates the rocker outer panel 52 extending from the A-pillar 14 rearward of the C-pillar assembly 18. The use of a horizontal joint further provides that the rocker outer panel 52 may be formed as a single component having a fully martensitic microstructure with anti-corrosion characteristics. In comparison to the boron material included in the C-pillar joint assembly 30, the anti-corrosion characteristics of the fully martensitic microstructure provides improved durability at a location on the vehicle body 10 that may be exposed to water or other elements. Further, the fully martensitic microstructure provides increased structural rigidity in comparison to the boron material included in the C-pillar joint assembly 30.

While various embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A vehicle C-pillar assembly comprising:
   a C-pillar;
   a rear quarter extension for mounting to the C-pillar and including an arc portion; and
   a rocker panel for mounting to the rear quarter extension to define a horizontal joint therebetween and including a notch providing space for the arc portion to extend upward along the C-pillar.

2. The assembly of claim 1, wherein the rocker panel includes an end, and wherein the rocker panel is secured to the C-pillar so that the end extends rearward of the C-pillar to contact and reduce rotation of a tire mounted adjacent to the C-pillar when a force directs the tire forward.

3. The assembly of claim 1, wherein a profile of the rocker panel is a C shape.

4. The assembly of claim 1, wherein the rocker panel extends from a vehicle A-pillar rearwardly past the C-pillar.

5. The assembly of claim 1, wherein the rocker panel is roll-formed and of an ultra-high strength steel.

6. The assembly of claim 1, wherein the rocker panel is treated to form a fully martensitic microstructure.

7. The assembly of claim 1, wherein the rocker panel is a rocker outer panel sized for securing to a rocker inner panel to define a tubular component.

8. A rocker panel for a vehicle pillar joint assembly comprising:
   a first flange;
   a second flange;
   a first horizontal flange extending between the first flange and the second flange;
   a third flange; and
   a second horizontal flange extending between the second flange and the third flange,
   wherein the flanges are arranged with one another to define a C-shape and sized for mounting to a rear quarter extension to define a horizontal joint therebetween.

9. The rocker panel of claim 8, wherein the first flange, the second flange, and the third flange are each on planes oriented parallel with one another.

10. The rocker panel of claim 8, wherein the first flange is sized for mounting to one of a vehicle A-pillar, a vehicle B-pillar, and a vehicle C-pillar.

11. The rocker panel of claim 8, wherein the second flange and second horizontal flange define a longitudinal axis along an edge therebetween oriented parallel with an axis defined by the horizontal joint.

12. The rocker panel of claim 8, wherein the first flange and the third flange are sized for mounting to corresponding flanges of a rocker inner panel to form a hollow tubular component.

13. The rocker panel of claim 8, wherein the rocker panel is fully martensitic and is sized to extend from a vehicle A-pillar rearward of a vehicle C-pillar.

14. The rocker panel of claim 8, wherein the rocker panel is a rocker outer panel sized for securing to a rocker inner panel to define a tubular component.

15. A vehicle C-pillar joint assembly comprising:
   a vehicle C-pillar;
   a rear quarter extension mounted to the vehicle C-pillar and including a base portion; and a rocker panel mounted to the rear quarter extension, covering the base portion, and defining a horizontal joint oriented parallel with an axis defined by the base portion, wherein a length between the horizontal joint and the base portion is variable based on a selected number of weld rows to secure the rear quarter extension and the rocker panel to one another.

16. The assembly of claim 15, wherein the rear quarter extension further includes a tab for mounting a flange of the rocker panel thereto to further orient the horizontal joint in parallel with the axis defined by the base portion.

17. The assembly of claim 15, wherein the rocker panel further comprises an end, and wherein the rocker panel is secured to the vehicle C-pillar so that the end extends rearward of the vehicle C-pillar to contact and reduce rotation of a tire mounted adjacent to the vehicle C-pillar when a force directs the tire forward.

18. The assembly of claim 15, wherein the base portion of the rear quarter extension and the horizontal joint are spaced from one another such that welds securing the rear quarter extension to the rocker panel are on a first plane different than a second plane of a moment of the vehicle C-pillar.

19. The assembly of claim 15, wherein the rocker panel is treated to have a fully martensitic microstructure and anti-corrosion characteristics.

20. The assembly of claim 15, wherein the base portion of the rear quarter extension is spaced from the horizontal joint approximately 17 mm-45 mm.

* * * * *